(12) United States Patent
Just

(10) Patent No.: US 8,911,824 B2
(45) Date of Patent: Dec. 16, 2014

(54) METHOD OF IMPREGNATING CRUCIBLES AND REFRACTORY ARTICLES

(75) Inventor: Arden L. Just, Kent, OH (US)

(73) Assignee: Zircoa, Inc., Solon, OH (US)

( * ) Notice: Subject to any disclaimer, the term of this patent is extended or adjusted under 35 U.S.C. 154(b) by 1563 days.

(21) Appl. No.: 12/346,939

(22) Filed: Dec. 31, 2008

(65) Prior Publication Data

US 2010/0166953 A1 Jul. 1, 2010

(51) Int. Cl.
| | |
|---|---|
| *C04B 5/06* | (2006.01) |
| *C04B 41/87* | (2006.01) |
| *C04B 41/00* | (2006.01) |
| *C04B 41/50* | (2006.01) |
| *F27B 14/10* | (2006.01) |

(52) U.S. Cl.
CPC .............. *C04B 41/87* (2013.01); *C04B 41/009* (2013.01); *C04B 41/5042* (2013.01); *F27B 14/10* (2013.01)
USPC ........................................ 427/226

(58) Field of Classification Search
USPC ........................................ 427/226
See application file for complete search history.

(56) References Cited

U.S. PATENT DOCUMENTS

| | | | |
|---|---|---|---|
| 2,766,032 A | 10/1956 | Meister .................... 432/264 |
| 4,552,786 A * | 11/1985 | Berneburg et al. ...... 427/249.15 |
| 4,856,576 A | 8/1989 | Peterson ................... 164/495 |
| 4,963,396 A | 10/1990 | Ito et al. .................... 427/294 |
| 5,114,890 A | 5/1992 | Peterson ................... 501/103 |
| 5,132,145 A | 7/1992 | Valentian ................ 427/249.4 |
| 5,690,724 A * | 11/1997 | Hester et al. ............. 106/198.1 |
| 6,218,005 B1 | 4/2001 | Moh ......................... 428/343 |
| 6,479,108 B2 | 11/2002 | Hariharan et al. ........... 427/453 |
| 6,491,971 B2 * | 12/2002 | Costantini et al. ........... 427/133 |
| 2002/0059708 A1 * | 5/2002 | Zhang et al. ................. 29/25.35 |
| 2002/0076501 A1 | 6/2002 | Costantini et al. ........... 427/133 |
| 2004/0166349 A1 | 8/2004 | Haaland .................... 428/500 |

* cited by examiner

*Primary Examiner* — Robert Vetere
(74) *Attorney, Agent, or Firm* — Kusner & Jaffe

(57) ABSTRACT

A method of sealing a surface and structure of a refractory crucible with a ceramic, comprising the steps of:
(a) heating a refractory crucible to a predetermined temperature;
(b) applying a wetting agent to a surface of the crucible;
(c) applying a ceramic slip along the inner surface of the crucible;
(d) applying a vacuum to an outer surface of the crucible;
(e) removing excess slip from the inner surface of the crucible;
(f) heating the crucible to remove moisture therefrom; and
(g) firing the crucible at a temperature between 1,300° C. and about 1,700° C.

17 Claims, No Drawings

METHOD OF IMPREGNATING CRUCIBLES AND REFRACTORY ARTICLES

FIELD OF THE INVENTION

The present invention relates generally to refractory crucibles and other refractory articles, and more particularly, to a protective sealing layer or layers that are applied to the inner surface or to the inner surface and outer surface of a crucible.

BACKGROUND OF THE INVENTION

Investment casting, often referred to as "lost wax casting," is a casting process that enables fabrication of near-net-shape metal parts from metals and metal alloys. Investment casting is typically used to form intricate, complex shapes with high precision. Refractory crucibles are used in investment casting processes for melting metal alloys. In this respect, alloys are melted in a crucible and then poured from the crucible into a mold to form a cast shape. Conventional refractory crucibles, such as zirconia crucibles, typically have a porous structure, which in part, increases resistance to thermal shock and which further minimizes the potential for cracking.

Certain metal alloys are more reactive than others with refractory materials and can react with the inner surface of the crucible. Nickel-based and cobalt-based superalloys that have high chrome concentrations and titanium alloys are examples of more reactive alloys. These reactive alloys tend to mechanically and/or chemically react with the refractory material, e.g., zirconia, which forms the crucible. With repeated use, the interaction between the alloy and refractory material can result in deterioration, i.e., erosion and corrosion, of the inner surface of the crucible. The molten alloy can penetrate into the porous surface of the crucible and react with the refractory material. Moreover, the penetration of the alloy into the porous surface of the crucible can further cause deterioration of the surface as the metal within the surface repeatedly solidifies and re-melts between melt cycles. The repeated melting and solidifying of the metal within the refractory material can cause cracking and spalling of the refractory and subsequent crumbling of the refractory at the surface of the crucible. This not only reduces the life of the crucible, but may also result in inclusions of refractory material in the cast part(s).

The present invention overcomes these and other problems and provides a refractory crucible having a dense inner surface structure that is less susceptible to penetration of alloys, and a method of impregnating the surface of a crucible.

SUMMARY OF THE INVENTION

In accordance with a preferred embodiment of the present invention, there is provided a method of sealing a surface of a refractory crucible with a ceramic, comprising the steps of:

(a) heating a refractory crucible to a temperature between about 100° C. and about 150° C.;

(b) applying a wetting agent to an inner surface of the crucible;

(c) applying a ceramic slip having a viscosity of about 100 to 3,500 centipoises along the inner surface of the crucible, the ceramic slip comprised of water, a wetting agent/dispersant and about 20% to 80% by weight of ceramic powder, at least 90% of the ceramic powder having a particle size of less than 1 micron;

(d) applying a vacuum to the crucible;

(e) removing excess slip from the inner surface of the crucible;

(f) heating the crucible to remove moisture therefrom; and (g) firing the crucible at a temperature between 1,300° C. and about 1,700° C. for about 2 to about 6 hours.

In accordance with another aspect of the present invention, there is provided a method of sealing a surface and structure of a refractory article with a ceramic, comprising the steps of.

(a) heating a refractory article to a temperature between about 100° C. and about 150° C.;

(b) applying a wetting agent to a surface of the article;

(c) applying a ceramic slip having a viscosity of about 100 to 3,500 centipoise along the surface of the article, the ceramic slip comprised of water, a wetting agent/dispersant and about 20% to 80% by weight of ceramic powder, at least 90% of the ceramic powder having a particle size of less than 1 micron;

(d) applying a vacuum to the article;

(e) removing excess slip from the surface of the article; and (f) heating the article to remove moisture therefrom.

An advantage of the present invention is a method of sealing a surface of a refractory article.

Another advantage of the present invention is a method of sealing a surface of a refractory article that is exposed to molten metal or molten glass.

A still further advantage of the present invention is a crucible for melting metal and metal alloys.

Another advantage of the present invention is a crucible as described above that is more resistant to chemical attack by reactive metal alloys.

Another advantage of the present invention is a crucible as described above having an inner surface impregnated with a material to resist penetration of molten alloys into the surface of the refractory crucible.

Another advantage of the present invention is a method of impregnating the surface of a crucible to enhance penetration resistance of the crucible to molten metal alloys.

These and other advantages will become apparent from the following description of a preferred embodiment.

DETAILED DESCRIPTION OF PREFERRED EMBODIMENT

The present invention relates to a method of sealing and/or impregnating the surfaces of a refractory article, and more particularly, to a refractory article that comes in contact with molten metal alloys, and to an article sealed by such a method. The present invention finds advantageous application in sealing or impregnating a refractory crucible and will be described with reference thereto. However, it will be appreciated that the present invention finds application in sealing or impregnating other refractory articles having different shapes. Broadly stated, the method of sealing a refractory article is comprised of impregnating the surface of an article with a ceramic material formed of fine ceramic powder and then drying or firing the article and ceramic material to form a more dense surface structure along the article.

The invention shall now be described with respect to a method for sealing a refractory crucible. As used herein, the term "crucible" means a cup-shaped refractory vessel having an inner surface and an outer surface, wherein the inner surface defines an inner, material-containing cavity, and the outer surface defines the exterior of the vessel. The crucible is formed of a porous refractory material. The present invention finds advantageous application with crucibles formed of different types of refractory material. By way of example and not limitation, zirconia crucibles, such as magnesia-stabilized zirconia crucibles, calcia-stabilized zirconia crucibles and yttria-stabilized zirconia crucibles, find advantageous use with the present invention.

In accordance with a preferred embodiment of the present invention, the inner surface of the crucible to be sealed is heated to a temperature above 100° C. According to one method of sealing the inner surface of a crucible, a clean refractory crucible is heated to a temperature between about 100° C. to about 150° C. Once the crucible has obtained a desired temperature, water is applied to the heated inner surface of the crucible to hydrate the same. The water preferably includes a wetting agent or dispersant to facilitate wetting the surface of the refractory crucible. In a preferred embodiment of the present invention, a solution of water and about 1% to about 3% wetting agent/dispersant is used. The water solution may be applied to the surface by spraying or it may be applied to the surface by brushing. The solution is applied to penetrate the porous inner surface of the crucible. The wetting of the interior surface is preferably repeated two or more times to insure that all porous surfaces are wetted.

Immediately after wetting the interior surface of the crucible, the crucible is filled with a ceramic slip. The ceramic slip is formed from a mixture of water and ceramic powder. The slip is comprised of water and between 20% to 80% by weight of a ceramic solid. The ceramic solid is comprised of ceramic powder. At least 90% of the ceramic powder has a particle size of less than 1 micron. The ceramic powder may be comprised of a single ceramic material or a mixture of two or more different ceramic materials. In a preferred embodiment of the present invention, the ceramic slip is formed of a ceramic material matching the ceramic composition forming the crucible. It is contemplated, however, that other ceramic materials may be applied to a crucible. Ceramic materials that find advantageous application in forming the ceramic slip include, by way of example and not limitation, $MgO$—$ZrO_2$, $Y_2O_3$—$ZrO_2$ and unstabilized $ZrO_2$, $CrO_2$, $Al_2O_3$ and combinations thereof.

The ceramic slip is formulated to have a viscosity of between about 100 and about 3,500 centipoise. A sintering aid may be included in the ceramic slip. The sintering aid comprises about 0.1% to about 1.0% by weight of the ceramic slip.

The ceramic slip is applied into the crucible while the crucible is still hot and the inner surface of the crucible is still wetted from the previous wetting.

A vacuum is then applied to the outer surface of the crucible. In a preferred embodiment, the crucible is placed within a vacuum chamber, and the crucible is then subjected to a vacuum of at least 25 inches of mercury. The vacuum is applied for a period of time sufficient to cause the ceramic slip to be drawn into the surface of the crucible. In this respect, by reducing the pressure around the exterior of the crucible, the ceramic slip in the crucible is drawn into the pores along the inner surface of the crucible. In a preferred embodiment of the present invention, the vacuum is applied for about 5 minutes to about 15 minutes. Following the vacuum step, excess slip is removed from the inner surface of the crucible. Any excess slip along the inner surface of the crucible may be removed by wiping the slip away using a damp cloth.

The crucible is then heated to remove moisture from the ceramic slip. Preferably, the crucible is heated to a temperature in excess of 100° C. to remove the moisture from the slip.

The foregoing steps of wetting the inner surface of the crucible, impregnating the surface of a crucible with a ceramic slip and drying the crucible are preferably repeated several times. With each successive wetting, impregnating and drying step, the ceramic slip further seals the surface of the crucible and fills the porous openings within the inner surface of the refractory crucible.

After a final impregnating and drying step, the crucible may be fired to sinter and bond the ceramic in the slip to the surface of the article, i.e., the crucible. As will be appreciated by those skilled in the art, a firing step may not be required, and the article, i.e., crucible, with the dried ceramic therein, may be used in a high-temperature industrial application, wherein in-situ high temperature pre-heating or the high temperatures of molten metal on the surface of the article, i.e., crucible, essentially results in sintering the ceramic slip.

For certain ceramic systems, and for articles used in certain applications, it may be desirable to fire the article prior to use. As will also be appreciated by those skilled in the art, the temperature and time required to fire a particular article will depend upon the ceramic system, i.e., the ceramic material forming the base article and the ceramic within the ceramic slip, as well as the configuration and size of the article itself. By way of example and not limitation, most systems can be fired to a temperature between about 1,300° C. and about 1,600° C. for about 2 hours to about 6 hours to fuse the ceramic slip with the refractory material forming the base article.

The present invention thus provides a method of sealing and impregnating the surface of a refractory article to make such surface less susceptible to penetration by reactive metal alloys or molten glass during use.

The present invention shall be further described in the following EXAMPLE, wherein a magnesia stabilized zirconia crucible is impregnated with a magnesia stabilized zirconia ceramic.

EXAMPLE

A fired, magnesia stabilized zirconia crucible, manufactured by Zircoa, Inc., under the designation of Composition 3001, is heated to a temperature of 105° C. in an oven and held at temperature for two (2) hours. Following the hold at temperature, the crucible is removed from the oven. Using a brush with a solution of water and 2% wetting agent/dispersant, the entire interior surface of the crucible is wetted. The solution penetrates the porous interior surface of the crucible. The wetting of the interior surface is repeated two or more times to insure that all porous surfaces are wetted in preparation of accepting the impregnating slip. Immediately the wetted crucible is filled with an impregnating slip.

The slip is formed of water and magnesia stabilized zirconium oxide. Ninety percent (90%) of the magnesia stabilized zirconium oxide in the ceramic slip has a particle size of less than about 1 micron. The magnesia stabilized zirconium oxide comprises 40% by weight of the ceramic slip. The ceramic slip includes 1.0 weight percent of sintering aid.

The ceramic slip is poured into the preheated and wetted crucible, filling the crucible. The crucible is then subjected to a vacuum of approximately 27 inches of mercury for five minutes. By reducing the pressure around the crucible, the impregnating slip is drawn into the porous interior surface of the crucible.

After five minutes, the vacuum is released and the crucible is removed. The excess slip remaining inside the crucible is removed. Any residual slip is wiped from the interior crucible surface using a damp cloth.

The crucible is then placed into a drying oven for two (2) hours. Another wetting and impregnating and drying treatment as described above is carried out on the crucible.

After the final impregnating and drying step, the crucible is fired to a temperature of 1,650° C. for two (2) hours.

The resultant fired ceramic crucible exhibits the following physical properties:

Standard crucible before impregnation:

| 1) | Porosity | 17.1% |
|---|---|---|
| 2) | Density | 4.66 g/cm³ |

Impregnated crucible:

| 1) | Apparent Porosity | 15.4% |
|---|---|---|
| 2) | Bulk Density | 4.64 g/cm³ |
| 3) | Net weight gain after firing | 1.4% |

| Property | Standard C3001 | Impregnated C3001 |
|---|---|---|
| Bulk density (g/cm3) | 4.64 | 4.67 |
| Apparent porosity (%) | 17.5 | 17.0 |
| Coefficient of thermal expansion (×10−6/° C., 25 to 1300° C.) | 1.5 | 1.8 |
| Relative Modulus of Rupture | 1X | 1.1X |

The impregnated crucible exhibits improved resistance to erosion and corrosion as a result of a more dense surface structure.

The foregoing description is a specific embodiment of the present invention. It should be appreciated that this embodiment is described for purposes of illustration only, and that numerous alterations and modifications may be practiced by those skilled in the art without departing from the spirit and scope of the invention. In this respect, while the invention was described with respect to sealing a refractory crucible, the present invention may be used to seal the surface(s) of other refractory devices that come into contact with corrosive materials, such as molten metal or molten glass, such as, by way of example and not limitation, refractory bricks, refractory nozzles and refractory slide gates. It is intended that all such modifications and alterations be included insofar as they come within the scope of the invention as claimed or the equivalents thereof.

Having described the invention, the following is claimed:

1. A method of sealing an inner surface of a refractory crucible with a ceramic, comprising the steps of:
   (a) heating a refractory crucible to a temperature between about 100° C. and about 150° C., said crucible having an inner surface defining a material-containing cavity and an outer surface;
   (b) applying a wetting agent to said inner surface of said crucible;
   (c) applying a ceramic slip having a viscosity of about 100 to 3,500 centipoise along the surface of said crucible, said ceramic slip comprised of water, a wetting agent/dispersant and about 20% to 80% by weight of ceramic powder, at least 90% of said ceramic powder having a particle size of less than 1 micron said ceramic slip is applied to the inner surface of said crucible by filling said crucible with said ceramic slip;
   (d) applying a vacuum to said crucible to draw said ceramic slip into the inner surface of said crucible;
   (e) removing excess slip from the inner surface of said crucible;
   (f) heating said crucible to remove moisture therefrom; and
   (g) firing the crucible at a temperature between 1,300° C. and about 1,700° C. for about 2 to about 6 hours.

2. A method as defined in claim 1, wherein said wetting agent is applied to said inner surface of said crucible by brushing.

3. A method as defined in claim 1, wherein said wetting agent is applied to said inner surface of said crucible by spraying.

4. A method as defined in claim 1, wherein said wetting agent is applied in a water solution including about 1% to about 3% by weight of a wetting agent or a dispersant.

5. A method as defined in claim 1, wherein said vacuum is applied to said outer surface of said crucible by a vacuum chamber.

6. A method as defined in claim 5, wherein a vacuum of at least 25 inches of mercury is applied to said crucible for about 5 to about 15 minutes.

7. A method as defined in claim 1, wherein steps (b), (c) and (d) are repeated a plurality of times before said crucible is fired.

8. A method as defined in claim 1, wherein said crucible is comprised of zirconia.

9. A method as defined in claim 1, wherein said ceramic slip is comprised of ceramic powder selected from a group consisting of $MgO$—$ZrO_2$, $Y_2O_3$—$ZrO_2$, unstabilized $ZrO_2$ or combinations thereof.

10. A method of sealing a surface and structure of a refractory article with a ceramic, comprising the steps of:
    (a) heating a refractory article to a temperature between about 100° C. and about 150° C.;
    (b) applying a wetting agent to a surface of said article;
    (c) applying a ceramic slip having a viscosity of about 100 to 3,500 centipoise along the surface of said article, said ceramic slip comprised of water, a wetting agent/dispersant and about 20% to 80% by weight of ceramic powder, at least 90% of said ceramic powder having a particle size of less than 1 micron;
    (d) applying a vacuum to said article to draw said ceramic slip into the surface of said refractory article;
    (e) removing excess slip from the surface of said refractory article;
    (f) heating said article to remove moisture therefrom; and
    (g) firing the article at a temperature between 1,300° C. and about 1,700° C. for about 2 to about 6 hours.

11. A method as defined in claim 10, wherein said wetting agent is comprised of a water solution including about 1% to about 3% of a wetting agent or a dispersant.

12. A method as defined in claim 10, wherein said vacuum is applied to said article by a vacuum chamber.

13. A method as defined in claim 12, wherein a vacuum of at least 25 inches of mercury is applied to said article for about 5 to about 15 minutes.

14. A method as defined in claim 10, wherein steps (b), (c) and (d) are repeated a plurality of times before said article is fired.

15. A method as defined in claim 10, wherein said article is a crucible and said surface is an inner surface of said crucible.

16. A method as defined in claim 15, wherein said crucible is comprised of zirconia.

17. A method as defined in claim 10, wherein said ceramic slip is comprised of ceramic powder selected from a group consisting of $MgO$—$ZrO_2$, $Y_2O_3$—$ZrO_2$, unstabilized $ZrO_2$, $CrO_2$, $Al_2O_3$, or combinations thereof.

* * * * *